Figure 1:
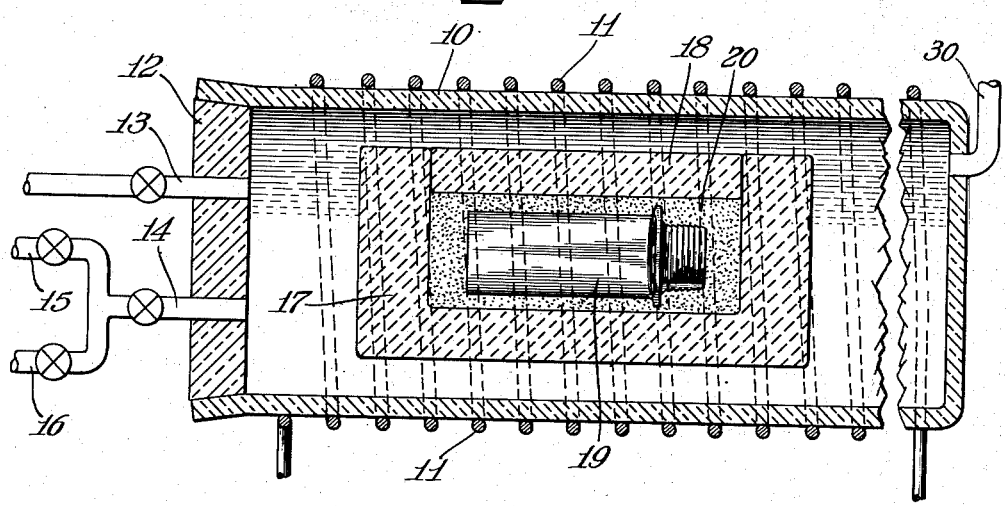

Inventors
Robert A. Kempe &
Robert R. Ruppender by *[signature]*

Attys

Patented Sept. 21, 1954

UNITED STATES PATENT OFFICE 2,689,807

METHOD OF COATING REFRACTORY METAL ARTICLES

Robert A. Kempe, Euclid, and Robert R. Ruppender, Cleveland, Ohio, assignors to Thompson Products, Inc., Cleveland, Ohio, a corporation of Ohio Application June 16, 1950, Serial No. 168,634

3 Claims. (Cl. 117—107)

The present invention relates to a method of and apparatus for coating refractory metal articles as, for example, in the coating of molybdenum or tungsten bodies with a coating capable of enhancing their resistance to high temperatures and corrosive atmospheres.

A newly devised process for coating refractory metal articles consists in passing a combined stream of hydrogen gas and a vaporized decomposable compound of the metal which furnishes the coating for the refractory metal into a heated furnacing zone to deposit the coating metal on surfaces of the refractory article. It has been found that under these conditions, metals such as silicon, zirconium, and aluminum can be deposited on surfaces of the article with the formation of intermetallic compounds, the latter serving as very efficient, adherent, corrosion-resistant surfaces for the refractory article. The temperature of the furnacing zone is maintained in the range from about 1600° F. to 2300° F. usually until a coating thickness of between .0003 and .003 inch is obtained on the surface.

The decomposable compound which may be used in such a procedure is preferably a halide of the coating metal. For example, the following compounds may be introduced into the coating zone for providing a silicon, aluminum, or zirconium coating:

Silicon tetrachloride,
Trichlor silane,
Silicon tetrabromide,
Aluminum bromide,
Aluminum iodide,
Zirconium chloride,
Zirconium bromide, or
Zirconium iodide In the furnacing zone, several reactions may occur. Some of the coating compound is probably decomposed by the high temperatures present in the coating zone. A large part of the halide is reduced by the stream of hydrogen in which the compound is introduced into the coating zone, and by the hydrogen atmosphere within the zone itself.

Still another reaction which occurs is the metathetical reaction between the coating metal compound and the refractory metal such as molybdenum wherein the coating metal is deposited on the molybdenum with the formation of a volatile molybdenum compound in the exchange reaction.

The three reactions mentioned above may be described by the following equations, where silicon tetrachloride is used as the starting material:

(1) $SiCl_4 \xrightarrow{\Delta} Si + 2Cl_2$ (2) $SiCl_4 + 2H_2 \longrightarrow Si + 4HCl$ (3) $2Mo + SiCl_4 \longrightarrow 2MoCl_2 + Si$ We have now found that the above-described process does not always result in the production of a uniform coating. It has been observed in siliconizing, for example, that portions of the molybdenum article being treated exhibit a fuzzy appearing growth which is not adherent to the molybdenum surface and which, when cleaned away, leaves areas that are not protected by the coating metal. We believe that this growth arises from the improper deposition of the coating metal. This abnormality may be due to the thermal decomposition of the silicon tetrachloride at the surface of the molybdenum article, which causes a liberation of nascent chlorine and a somewhat random deposition of the silicon.

It is also possible that the observed defect could be due to traces of water vapor which are unavoidably present in the system due to leaks, or incomplete purging of the system.

The defect in the coating may also be due to the presence of oxygen adsorbed onto the articles being coated or present as a contaminant in the silicon tetrachloride.

We believe that the combination of the factors mentioned above causes a chemical instability of the coating reaction which manifests itself particularly in the upstream portions of the siliconizing chamber.

It is thus, an object of the present invention to provide a method for coating refractory metals to obtain a dense, substantially uniform coating without the presence of improperly coated portions.

Another object of the present invention is to provide a method for coating refractory metals to insure the production of a dense, uniform coating by providing preferential areas upon which the decomposition of the coating compound may be accomplished immediately prior to the deposition of the freed metal upon the refractory surface.

Still another object of the present invention is to provide a method of insuring the homogeneity of a mixture of hydrogen and coating metal compound during a vapor phase deposition process.

Still another object of the invention is to provide apparatus for carrying out the improved method of the present invention.

We have found that the quality of deposit contained in the above-described coating process may be greatly increased by at least partially decomposing the volatile coating compound immediately prior to the coating of the refractory metal article along surfaces other than the surfaces of the article itself. In other words, we provide preferential areas for decomposition of the coating compound within the furnacing zone so that any impurities are left on these areas, and the coating metal is deposited on the refractory metal surface in a high degree of purity.

We prefer to secure this preferential decomposition by enclosing the articles to be coated in a porous refractory container during the coating process. The ceramic material should be of such a composition as to not react chemically with either the ingredients of the atmosphere or the refractory metal being treated in a manner adverse to the quality of the coating produced.

Also, the refractory casing must have the proper porosity. We have found that a porosity of between 25 and 85% is suitable for most coating processes, with 65% being the optimum value. If the porosity is too low, being below about 25%, the flow of the coating metal compound by diffusion through the refractory container becomes very much restricted so that the time of the coating reaction is very much increased. On the other hand, if the packing material is too porous, there will be insufficient interference or channeling of the vapors through the packing material so that little or no decomposition of the coating compound will occurs within the refractory container. The upper limits of the porosity which will be operable for the purpose will depend, to a large extent, upon the thickness of the container which may be tolerated in the furnace, as a material having too high a degree of porosity when used in the form of a relatively thin walled container may nevertheless be usable if the thickness is substantially increased to thereby increase the effective length of the channels through which the gaseous stream passes.

Another requirement for the refractory container is that it must be strong enough at the deposition temperature to support the articles being coated.

A large number of refractory materials are available for use in accordance with the present invention. Typical among these materials are aluminum silicates, alumina, zirconia, zirconium silicate, and fused silica.

It has been found that through the use of such porous ceramic packing material, the quality of the deposit on the refractory metal article is substantially enhanced. The impurities which tend to form upon decomposition of the coating metal compound are left within the pores of the refractory container, and do not contaminate the surface of the article contained within the container.

Figure 2:
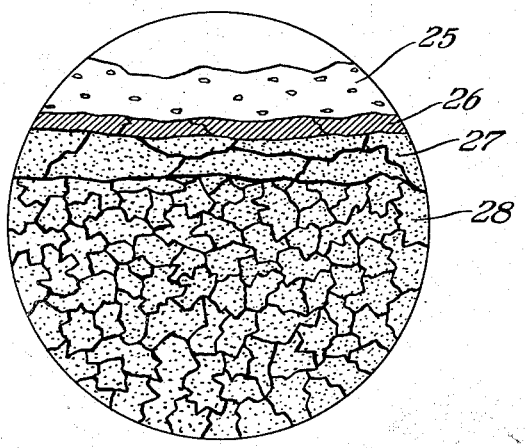

A further description of the present process and an apparatus for performing the process is illustrated in the attached sheet of drawings, in which Figure 1 is a fragmentary view of a furnace which may be employed in the practice of the present invention; and Figure 2 is a greatly enlarged photomicrograph showing the crystal structure of a silicon coated molybdenum article produced by the process of the present invention.

As shown on the drawings:

Reference numeral 10 denotes generally a furnacing tube such as silica or quartz which is heated to the coating temperature by means of a resistance winding 11 encircling the tube 10. An end of the tube 10 is provided with an end closure 12 sealing the interior of the tube 10 from the atmosphere. A valved inlet 13 is provided to introduce a purging gas, such as argon, helium, nitrogen, and the like into the furnacing tube 10. The inlet 13 may also be used to introduce hydrogen gas into the tube 10 after purging has been completed. A second inlet 14 is provided for introducing a gaseous mixture of hydrogen and the decomposable coating compound, the inlets for these gases being indicated at 15 and 16. Alternatively, the mixture of hydrogen and coating compound may be introduced into the furnacing tube 10 by bubbling hydrogen through a liquid bath of the coating compound. If desired, the hydrogen may be introduced in admixture with an inert gaseous diluent, such as argon. As much as 50% or more of the hydrogen may be replaced by such a diluent without substantially affecting the reaction, and these diluents reduce the possibility of explosion.

A porous refractory container 17 having a tightly fitting top closure 18 is disposed within the furnace tube 10 in the path of the combined stream of hydrogen and vaporized coating metal compound. One or more of the articles to be coated, which in the illustrated instance are molybdenum turbine buckets 19, are contained within the porous refractory container 17. In the container 17, we prefer to envelop the article to be coated with a coarse, granular refractory material which may be of the same type used for the container 17. This coarse packing is illustrated at reference numeral 20. The stream of hydrogen and the vaporized coating metal compound can thus pass through the pores of the porous ceramic container 17 and diffuse through the granular ceramic packing 20 prior to contacting the article 19 which is to be coated. In this way, thorough mixing of the hydrogen and the coating metal compound is accomplished, and at least some of the compound is decomposed by the action of hydrogen and the high temperature in the furnace during passage of the gaseous stream through the container 17 and the packing 20. The pure coating metal is then deposited upon the surface of the refractory article 19. The gases are vented from the furnace by means of an outlet 30 at the closed end of the tube.

In carrying out the process, we have found it advisable to change the relative positions of the refractory container 17 in the furnace during the course of the coating. After about one-half of the time required for coating has elapsed, we prefer to shift the containers which were originally downstream from the point of introduction of the gases to an upstream position to compensate for the proportionately higher concentration of coating metal in the furnace near the inlet.

It will be appreciated that the coating process can be made continuous by using suitable conveyors within the furnace, and that the inlet gases can be introduced along the spaced points within the furnacing zone to secure a more uniform concentration of coating metal within the furnacing zone and thus secure a uniform deposit.

A silicon-coated surface produced by the process of the present invention is illustrated in Figure 2. The outer layer 25 of the article consists essentially of pure silicon in a homogeneous layer without any observable weak spots, or flaws. Immediately underlying the silicon layer 26 is a crystal layer which is apparently a mixture of silicon and silicon-rich intermetallic compounds, for example $MoSi_2$. Underlying the intermediate layer 26 is a second intermetallic compound layer 27 of relatively massive crystals which include compounds of the type MoSi. The body metal 28 consists of molybdenum crystals.

It will be understood that modifications and variations may be effected without departing from the scope of the novel concepts of the present invention.

We claim as our invention:

1. In the method of coating a refractory metal article including the step of treating said article with a combined stream of hydrogen and a vaporized decomposable halide of the coating metal, the improvement which comprises surrounding the article to be coated with a closed continuous porous wall container of appreciable thickness having a uniform porosity of from 25% to 85% and being free from channels, embedding the article in said container in a porous ceramic packing, enveloping said continuous wall container with a mixture of hydrogen and a vaporized decomposable halide of said coating metal, passing said mixture through said wall and packing to at least partially decompose said decomposable halide, and immediately thereafter depositing the liberated metal onto said article.

2. In the method of coating a refractory metal article including the step of treating said article with a combined stream of hydrogen and a vaporized decomposable componud of the coating metal, the improvement which comprises surrounding said article with a particulated mass of refractory particles, surrounding the article and said particulated mass with a closed porous container of appreciable thickness having a uniform porosity of from 25% to 85% and being free from channels, enveloping said closed container with a mixture of hydrogen and a vaporized decomposable halide of said coating metal, passing said mixture through said wall and said particulated mass in succession to at least partially decompose said decomposable halide, and immediately depositing the liberated metal onto said article.

3. The method of coating refractory metal articles which comprises surrounding an article to be coated with a particulated mass of refractory particles in a closed porous ceramic container having a porosity between about 25 and 85%, enclosing said container in a furnace downstream from the inlet end of the furnace, flowing a stream of hydrogen and a halide of the coating metal through the furnace and through the pores of the container, heating the furnace to temperatures about 1600 to 2300° F., allowing the stream of gaseous material to diffuse through the container and partially decompose the halide compound, immediately thereafter depositing the coating metal on the article, and moving the container upstream toward the inlet end of the furnace prior to completion of the deposition of metal on the article.

References Cited in the file of this patent

UNITED STATES PATENTS

| Number | Name | Date |
|---|---|---|
| 1,156,496 | Ruder | Oct. 12, 1915 |
| 1,306,568 | Weintraub | June 10, 1919 |
| 1,497,417 | Weber | June 10, 1924 |
| 1,726,431 | Fourment | Aug. 27, 1929 |
| 1,818,909 | Reerink | Aug. 11, 1931 |
| 1,902,503 | Howe | Mar. 21, 1933 |
| 1,910,968 | Salkover | May 23, 1933 |
| 2,166,919 | Nichols | July 18, 1939 |
| 2,175,922 | Scott | Oct. 10, 1939 |
| 2,219,004 | Daeves et al. | Oct. 22, 1940 |
| 2,235,504 | Rennie | Mar. 18, 1941 |
| 2,257,668 | Becker | Sept. 30, 1941 |
| 2,315,294 | Stewart et al. | Mar. 30, 1943 |
| 2,339,136 | Bennett | Jan. 11, 1944 |
| 2,394,002 | Ness | Feb. 5, 1946 |
| 2,501,051 | Henderson et al. | Mar. 21, 1950 |
| 2,543,708 | Rice et al. | Feb. 27, 1951 |